United States Patent
Danducci, II et al.

(10) Patent No.: US 12,056,438 B2
(45) Date of Patent: Aug. 6, 2024

(54) ROLE-BASED CROSS DATA SOURCE ACTIONABLE CONVERSATION SUMMARIZER

(71) Applicant: International Business Machines Corporation, Armonk, NY (US)

(72) Inventors: Angelo Danducci, II, Austin, TX (US); Kirti A. Apte, Austin, TX (US); Olga Saprycheva, Austin, TX (US); Tyrome Sweet, Merced, CA (US)

(73) Assignee: International Business Machines Corporation, ArmonK, NY (US)

( * ) Notice: Subject to any disclaimer, the term of this patent is extended or adjusted under 35 U.S.C. 154(b) by 9 days.

(21) Appl. No.: 17/544,759

(22) Filed: Dec. 7, 2021

(65) Prior Publication Data

US 2023/0177256 A1 Jun. 8, 2023

(51) Int. Cl.
*G06F 40/166* (2020.01)
*G06F 40/20* (2020.01)

(52) U.S. Cl.
CPC ............ *G06F 40/166* (2020.01); *G06F 40/20* (2020.01)

(58) Field of Classification Search
CPC ............................... G06F 40/166; G06F 40/20
USPC ........................................................ 715/254
See application file for complete search history.

(56) References Cited

U.S. PATENT DOCUMENTS

| | | | |
|---|---|---|---|
| 7,584,417 B2 | 9/2009 | Friend et al. | |
| 7,707,257 B2 | 4/2010 | Taieb et al. | |
| 9,116,984 B2 * | 8/2015 | Caldwell | G06F 16/345 |
| 10,181,326 B2 | 1/2019 | Raanani et al. | |
| 10,389,662 B2 | 8/2019 | Chudge et al. | |
| 10,742,581 B2 | 8/2020 | Bastide et al. | |
| 10,810,361 B1 | 10/2020 | Venkatraman et al. | |
| 10,831,799 B2 | 11/2020 | Dhoolia et al. | |
| 10,891,950 B2 | 1/2021 | Huang et al. | |

(Continued)

FOREIGN PATENT DOCUMENTS

CA 2840485 C 10/2019

OTHER PUBLICATIONS

Chen, Jiaao et al., "Structure-Aware Abstractive Conversation Summarization via Discourse and Action Graphs", Proceedings of the 2021 Conference of the North American Chapter of the Association for Computational Linguistics: Human Language Technologies, Jun. 6-11, 2011, 12 pages.

(Continued)

*Primary Examiner* — Michael Roswell
*Assistant Examiner* — Tionna M Burke
(74) *Attorney, Agent, or Firm* — Stephen J. Walder, Jr.; Robert D. Bean

(57) ABSTRACT

A mechanism is provided in a data processing system for role-based cross data source actionable conversation summarization. The mechanism aggregates conversation data from a plurality of conversation data sources. The mechanism applies a computerized summarization process to the aggregated conversation data to generate at least one role-based summary of the aggregated conversation data. The mechanism applies a machine learning classifier to the at least one role-based summary to determine if each sentence in the at least one role-based summary is an actionable item. Responsive to detecting an actionable item, the mechanism adds the actionable item to the at least one role-based summary.

20 Claims, 4 Drawing Sheets

(56) References Cited

U.S. PATENT DOCUMENTS

| | | | |
|---|---|---|---|
| 11,062,128 B2 | 7/2021 | Mehrseresht et al. | |
| 2005/0278325 A1* | 12/2005 | Mihalcea | G06F 40/284 |
| 2011/0179061 A1* | 7/2011 | Chilakamarri | G06Q 10/00 |
| | | | 707/769 |
| 2012/0150631 A1* | 6/2012 | Root | G06Q 30/0251 |
| | | | 715/753 |
| 2016/0180279 A1* | 6/2016 | Koerner | G06Q 10/06393 |
| | | | 705/7.15 |
| 2017/0161372 A1* | 6/2017 | Fernández | G06F 40/211 |
| 2019/0104092 A1* | 4/2019 | Koohmarey | H04L 51/02 |
| 2020/0175112 A1 | 6/2020 | Dunne et al. | |
| 2020/0243095 A1 | 7/2020 | Adlersberg et al. | |
| 2020/0396184 A1 | 12/2020 | Perazzo et al. | |
| 2021/0089860 A1 | 3/2021 | Heere et al. | |
| 2021/0097502 A1 | 4/2021 | Helleli et al. | |
| 2021/0125192 A1 | 4/2021 | Beaver, III et al. | |

OTHER PUBLICATIONS

Joshi, Prateek, "An Introduction to Text Summarization using the TextRank Algorithm (with Python implementation)", https://www.analyticsvidhya.com/blog/2018/11/introduction-text-summarization-textrank-python/, Nov. 1, 2018, 16 pages.

Kumar, Harshit et al., "Dialogue Act Sequence Labeling Using Hierarchical Encoder with CRF", AAAI-2018 32nd Conference on, pp. 3440-3447, Apr. 29, 2018.

Li, Jianjun et al., "A Novel Semantic Inference Model With a Hierarchical Act Labels Embedded for Dialogue Act Recognition", IEEE Access vol. 7, pp. 167401-167408, Sep. 27, 2019.

Lin, Chu-Cheng et al., "Actionable Email Intent Modeling with Reparametrized RNNs", The Thirty-Second AAAI Conference on Artificial Intelligence (AAAI-18), Jan. 1, 2018, 9 pages.

Purver, Matthew et al., "Detecting and Summarizing Action Items in Multi-Party Dialogue", SIGDIAL 8th SIGDIAL Workshop on, pp. 18-25, Sep. 1-2, 2007.

* cited by examiner

ROLE-BASED CROSS DATA SOURCE ACTIONABLE CONVERSATION SUMMARIZER

BACKGROUND

The present application relates generally to an improved data processing apparatus and method and more specifically to mechanisms for automatically summarizing conversation data from multiple sources with actionable items based on roles.

Automatic text summarization is a process of generating a concise and meaningful summary of text from text resources such as books, news articles, blog posts, research papers, mails, and tweets. Text summarization can be divided into two categories: extractive summarization and abstractive summarization. Extractive summarization includes methods that rely on extracting several parts, such as phrases and sentences, from a piece of text and stacking them together to create a summary. Identifying the right sentences for summarization is of utmost importance in an extractive method. Abstractive summarization includes methods that use advanced natural language processing (NLP) techniques to generate an entirely new summary. Some parts of this summary may not even appear in the original text.

TextRank is a text summarization technique that is used to generate document summaries. TextRank uses an extractive approach and is an unsupervised graph-based text summarization technique. The basic steps involved in TextRank algorithm are as follows: extract all the sentences from the text document; create a graph out of the extracted sentences; find importance scores of each node by iterating the algorithm until convergence; and sort the sentences in a descending order based upon their importance scores. The first k sentences are chosen to be a part of the text summary, where k is configurable.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system for role-based cross data source actionable conversation summarization. The method comprises aggregating conversation data from a plurality of conversation data sources. The method further comprises applying a computerized summarization process to the aggregated conversation data to generate at least one role-based summary of the aggregated conversation data. The method further comprises applying a machine learning classifier to the at least one role-based summary to determine if each sentence in the at least one role-based summary is an actionable item and responsive to detecting an actionable item, adding the actionable item to the at least one role-based summary.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
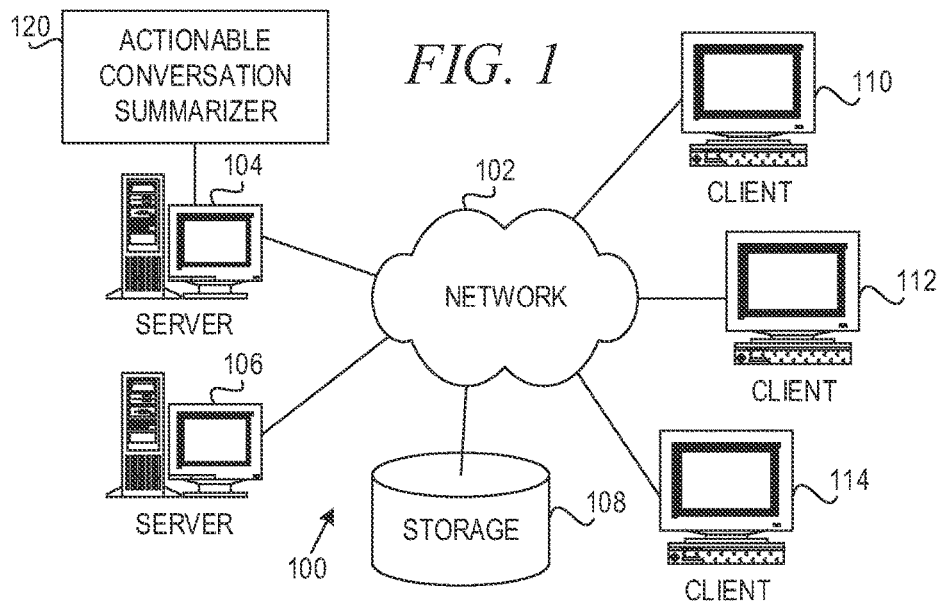
FIG. 1 is an example diagram of a distributed data processing system in which aspects of the illustrative embodiments may be implemented.

Currently, there is no easy way to get a summary with actionable items from different data sources without reading through the multitude of data sources, either in breadth or length. Information or conversation analysis from disparate, distributed data sources is needed to solve complex system problems (e.g., email, conversation threads, texts, etc.). As an example, operations team members may need ticket numbers or task identifiers for system errors or failures that are in a large source text where most of the text does not contain ticket numbers or task identifiers but instead talks about the problem at large.

The illustrative embodiments allow operations team members to receive information they need with the necessary steps to resolve the problem without being required to read every detail of the corpus of data. The illustrative embodiments solve problems associated with computerized processes for summarizing text and problems associated with ad hoc communications systems. For example, operations team members may discuss business aspects of a project using email, general problems using a teamwork communications hub (e.g., the Slack® instant messaging platform), and specific actionable items on a development collaboration platform (e.g., GitHub®). SLACK is a registered trademark of Slack Technologies, LLC, in the United States, other countries, or both, GITHUB is a registered trademark of GitHub, Inc. in the United States, other countries, or both. The illustrative embodiments provide a computer tool for summarizing conversations across platforms, for detecting actionable items in the conversations, and for generating summaries with actionable items based on roles of users.

Before beginning the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software executing on computer hardware, specialized computer hardware and/or firmware, or any combination thereof that performs the specified functions including, but not limited to, any use of a general and/or specialized processor in combination with appropriate software loaded or stored in a machine readable memory and executed by the processor to thereby specifically configure the processor to perform the specific functions of the illustrative embodiments. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
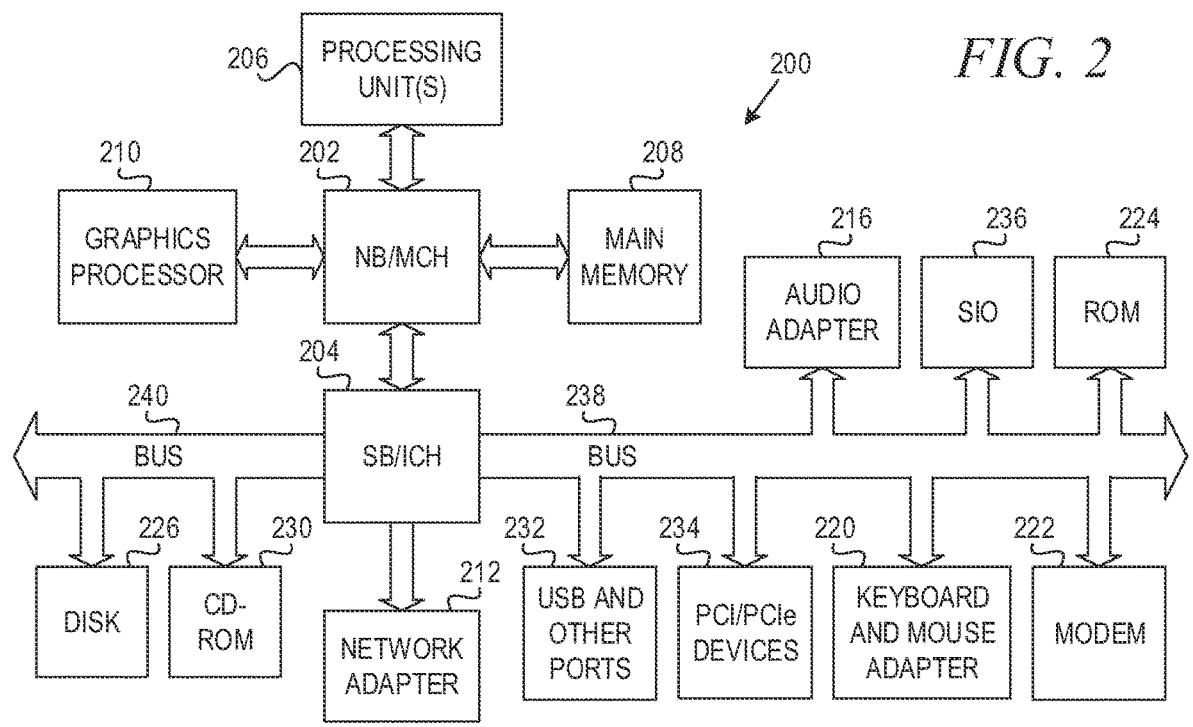
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

In accordance with an illustrative embodiment, server 104 implements an actionable conversation summarizer engine 120, which aggregates information from different conversation sources, such as email, instant messaging, development collaboration platform, short message service (SMS), etc. Actionable conversation summarizer engine 120 uses a machine learning model with a generative pretrained transformer to generate role-based summaries with actionable items by extracting textual information from different conversation sources. Different roles may receive different actionable items from the same input. For example, support and management would have different tasks based on the same conversation thread.

In one embodiment, actionable conversation summarizer engine 120 uses a well-known natural language processing (NLP) summation tool, such as TextRank, for example, capable of providing sentence extraction, to generate an initial summary. After the initial summary is created, actionable conversation summarizer engine 120 uses supervised classifier learning techniques to determine if a given sentence is or is not action item.

In another embodiment, instead of classifying each sentence as an action item, an action item can be mapped to additional outcomes based on the action item. For instance, based on a given sentence, actionable conversation summarizer engine 120 may create a prefilled GitHub issue or a customer impacting event (CIE).

In an illustrative embodiment, actionable conversation summarizer engine 120 injects or integrates conversation summaries with actionable items as a navigation element in a conversation source interface where the user can visualize a conversation summary tree and take actions. Actionable conversation summarizer engine 120 may generate a report by time series, roles, or actions. Examples of different actions may include generating a ticket to track an issue in a development collaboration platform, generating an instant message notification or email from the conversation summary, etc.

Actionable conversation summarizer engine 120 generates actionable items from an input corpus based on user role (e.g., engineer, manager, etc.). Actionable conversation summarizer engine 120 presents actionable items and associated data used to generate the actionable item, utilizing a conversation tree. Actionable conversation summarizer engine 120 displays a navigable conversation tree with respect to actionable items.

Actionable conversation summarizer engine 120 makes critical information more accessible with action items without required reading of corpus of data. Actionable conversation summarizer engine 120 helps keep track of messages and organizes them in a more digestible format. Furthermore, actionable conversation summarizer engine 120 helps to understand whether a text is only informative or is actionable and to what role specifically those action items would be assigned. Still further, actionable conversation summarizer engine 120 takes additional action based on the action item generated, e.g., create a ticket, forward a report, create a CIE, generate a template, etc.

Actionable conversation summarizer engine 120 provides a process to visualize summarized conversation through a user interface display. Actionable conversation summarizer engine 120 injects navigation and display into the conversation summary and action item view. Actionable conversation summarizer engine 120 provides the ability to view the original data source, which lends artificial intelligence (AI) explainability. Actionable conversation summarizer engine 120 also provides the ability to see chronologically close data. Actionable conversation summarizer engine 120 organizes different actionable outcomes by role. Actionable conversation summarizer engine 120 provides the ability to explore nearby data in terms of relevance to role or action item.

As shown in FIG. 1, one or more of the computing devices, e.g., server 104, may be specifically configured to implement actionable conversation summarizer engine 120. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general-purpose computing device. Moreover, as described hereafter, the implementation of the mechanisms of the illustrative embodiments improves the functionality of the computing device and provides a useful and concrete result that facilitates role-based cross data source actionable conversation summarization.

The computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. In a client device, the operating system may be a commercially available operating system such as Microsoft® Windows 10®. An object-oriented programming system, such as the Java® programming system, may run in conjunction with the operating system and provides calls to the operating system from Java® programs or applications executing on data processing system 200.

As a server, data processing system 200 may be, for example, an IBM eServer™ System p® computer system, Power™ processor-based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the actionable conversation summarizer.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3A:
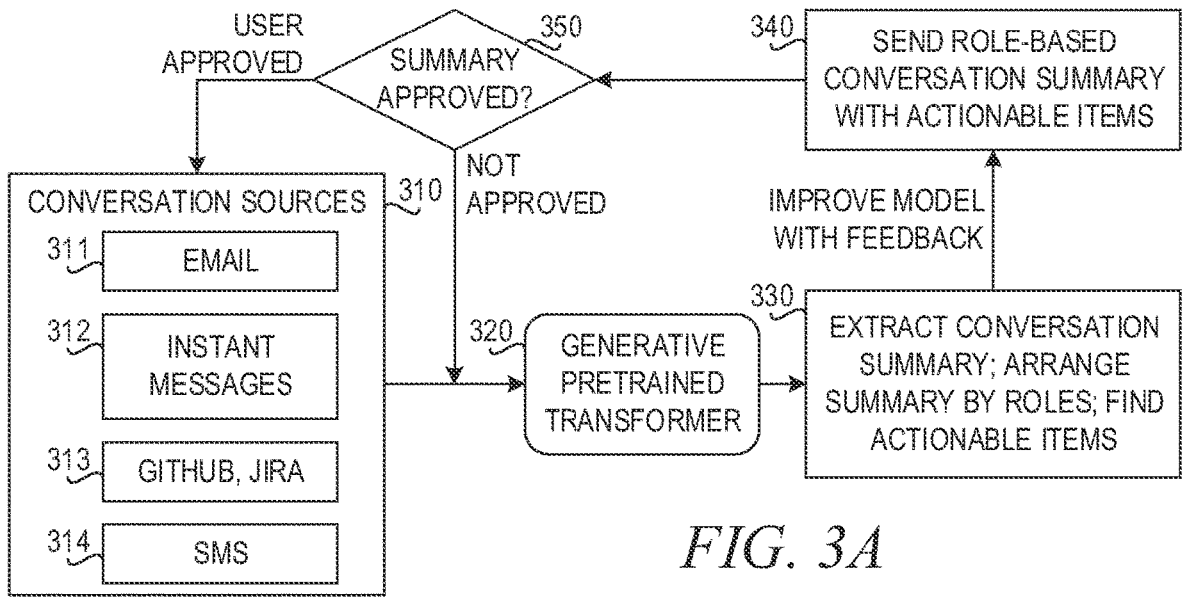
FIG. 3A is a block diagram of an actionable conversation summarizer engine in accordance with an illustrative embodiment.

FIG. 3A is a block diagram of an actionable conversation summarizer engine in accordance with an illustrative embodiment. The actionable conversation summarizer engine uses natural language processing on conversation sources 310, which include email 311, instant messages 312, development collaboration platforms 313 (e.g., GitHub, Jira), and short messaging service (SMS) messages 314. The corpora of conversation sources 310 can be generated and constantly updated by aggregating data sources 311-314 into a database or a Data Lake. Role is included in the tag for the data set.

Generative pretrained transformer 320 extracts conversation summary, arranges summary by roles, and finds actionable items (block 330). The actionable conversation summarizer engine then improves the model with feedback by sending the role-based conversation summary with actionable items to one or more users (block 340). The actionable conversation summarizer engine creates a summary of the aggregate data sources form the corpora. In one embodiment, this can be done using the TextRank computerized summarization process or a similar technique that uses NLP and has keyword and sentence extraction capabilities.

The actionable conversation summarizer engine determines whether the role-based conversation summary with actionable items is approved by the one or more users (block 350). If the role-based conversation summary is approved, then the summary is integrated in a user interface for one or more of the conversation sources 310. If the role-based conversation summary is not approved in block 350, then this is used to improve generative pretrained transformer 320.

Figure 3B:
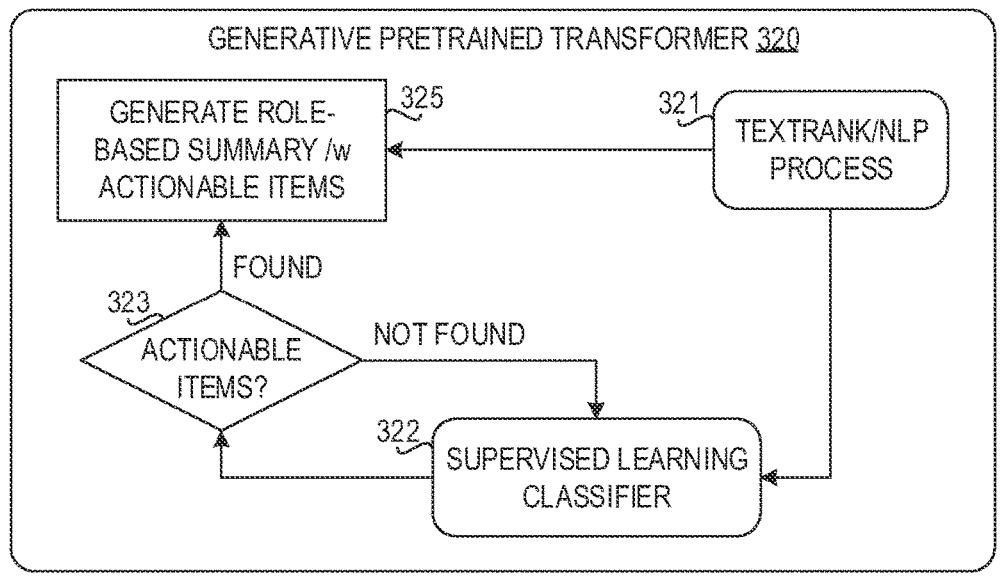
FIG. 3B is a block diagram of a generative pretrained transformer in accordance with an illustrative embodiment.

FIG. 3B is a block diagram of a generative pretrained transformer in accordance with an illustrative embodiment. Generative pretrained transformer 320 uses the TextRank process, or other computerized text summarization process, and natural language processing 321 to generate a role-based summary (block 325). The TextRank/NLP process 321 also provides the generated role-based summary to supervised learning classifier 322.

Any of a plurality of classification techniques can be used to detect actionable items, but a supervised classification technique is used in the illustrative embodiment. A given summary is displayed and determined to either contain/cause an actionable item or not contain/cause an actionable item. For example, "Create a GitHub issue for dashboard integration" contains an action item, and "Customer complained about potential outage" contains a cause for an action item.

Generative pretrained transformer 320 then determines whether actionable items are found within the role-based summary (block 323). If actionable items are not found, then feedback is sent to supervised learning classifier 322. If actionable items are found in block 323, then the actionable items are added to the generated role-based summary at block 325. If actionable items are found in block 323, then this feedback can also be sent back to supervised learning classifier 322. This feedback loop may be integrated directly into the user interface when presented to the user for additional training.

In one embodiment, generative pretrained transformer 320 provides the potential to change how an action item is worded or generated based on role. Data needed to change action item wording based on role can be gathered through the same user interface element that is used to display the action item to the user. For example, if an action item is generated, generative pretrained transformer 320 can present this to the user and ask if it would be worded differently for a different role. In this case, the user can provide the recommended output for a different role in an open-ended format (e.g., write in a text field). This data can be used as training data for the action item classifier 322.

In one embodiment, generative pretrained transformer 320 detects a role-based actionable item using an additional classifier utilizing multi-label classification on the corpus of actionable items. That is, training data consists of conversation data having labeled actionable items. Each actionable item is then labeled with one or more roles using supervised learning. For example, an actionable item containing an outage can be labeled as needing a response from developers, management, and support. However, for an actionable item that contains a new feature request developers are likely the only label. These labels are then used to train the role-based actionable item classifier.

Figure 4:
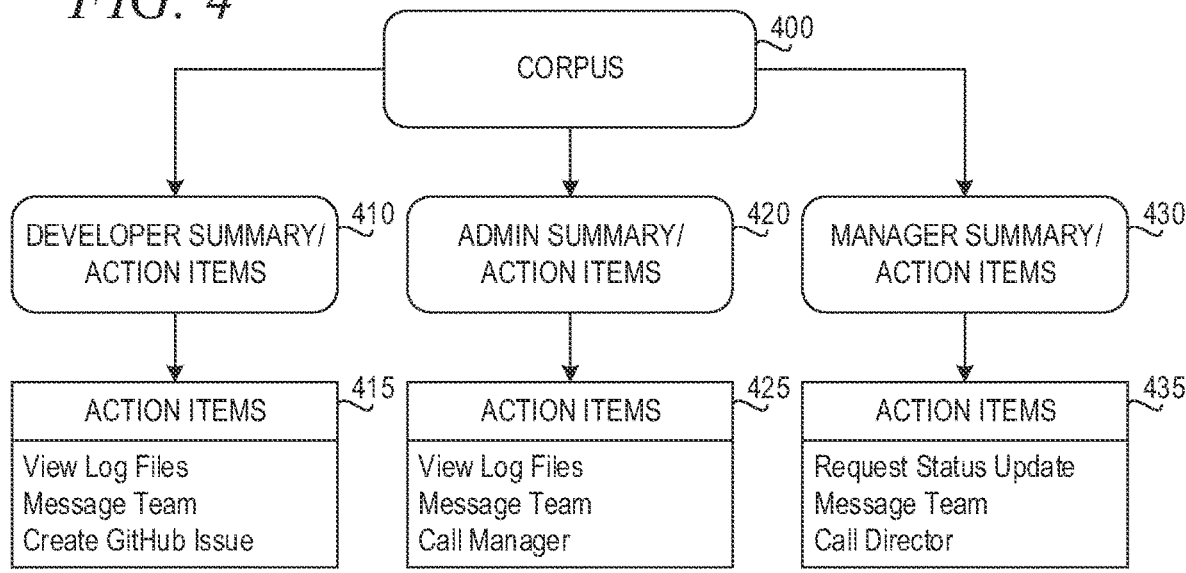
FIG. 4 depicts an example mapping of action items based on role in accordance with an illustrative embodiment.

FIG. 4 depicts an example mapping of action items based on role in accordance with an illustrative embodiment. Corpus 400 comprises multiple conversation data sources, such as email, SMS messages, instant messages, and developer collaboration service content, for example. Based on corpus 400, the actionable conversation summarization engine generates developer summary with action items 410, administrator summary with action items 420, and manager summary with action items 430. The developer summary 410 includes action items 415 that are specific to the developer role. The administrator summary 420 includes action items 425 that are specific to the administrator role. The manager summary 430 includes action items 435 that are specific to the manager role.

Figure 5:
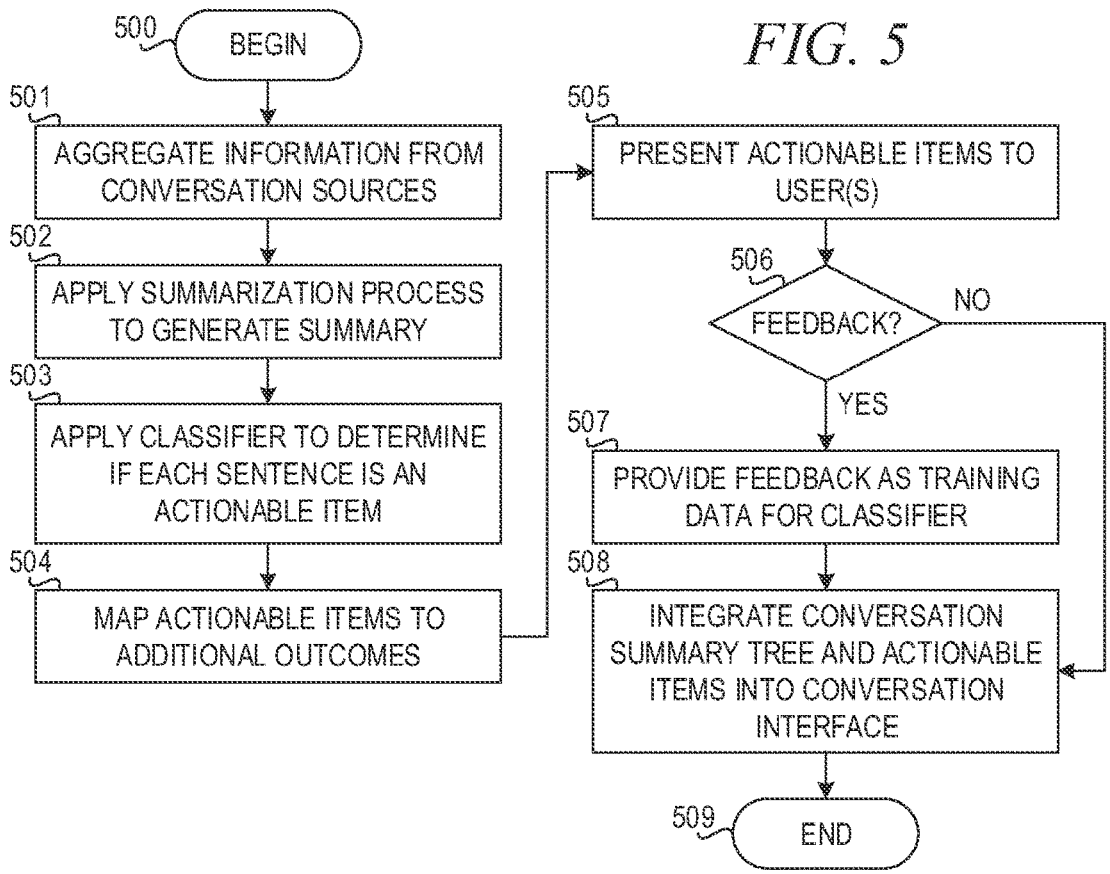
FIG. 5 is a flowchart illustrating operation of an actionable conversation summarization engine in accordance with an illustrative embodiment.

In the depicted example, the actionable conversation summarization engine creates an example output summary as follows: "Create integration between platform and dashboard to measure user metrics." The actionable conversation summarization engine detects the following action item: "Create integration." An example conversation output from an instant messaging thread is as follows:
Server 9984 is down
Time 09:24:11
Date May 4, 2021
Log file <link to log file or log file itself>
The Director role output is as follows:
Bluecloud server down
Request status update/View Conversation Tree
Message Team
Call Stakeholder
The Manager role output is as follows:
Bluecloud server 9984 down
Request status update/View Conversation Tree
Message Team
Call Director The System Administrator role output is as follows:
Bluecloud server 9984 down
View Log Files/View Conversation Tree
Message Team
Call Manager
The Software Engineer role output is as follows:
Bluecloud server 9984 down
View Log Files/View Conversation Tree
Create GitHub Issue
Message Team
Call Manager FIG. 5 is a flowchart illustrating operation of an actionable conversation summarization engine in accordance with an illustrative embodiment. Operation begins (block 500), and the actionable conversation summarization engine aggregates information from conversation data sources (block 501). The actionable conversation summarization engine applies a summarization process to generate a role-based summary of the aggregated conversation data (block 502). The actionable conversation summarization engine then applies a classifier to determine if each sentence is an actionable item (block 503). The actionable conversation summarization engine maps actionable items to additional outcomes (block 504).

Then, the actionable conversation summarization engine presents the detected actionable items to one or more users (block 505) and determines whether the one or more users provide feedback (block 506). If a user provides feedback, the actionable conversation summarization engine provides the feedback as training data for the classifier (block 507). Thereafter, or if no feedback is provided in block 506, the actionable conversation summarization engine integrates the conversation summary tree and actionable items into the user interface of the conversation source data (block 508), and operation ends (block 509).

Figure 6:
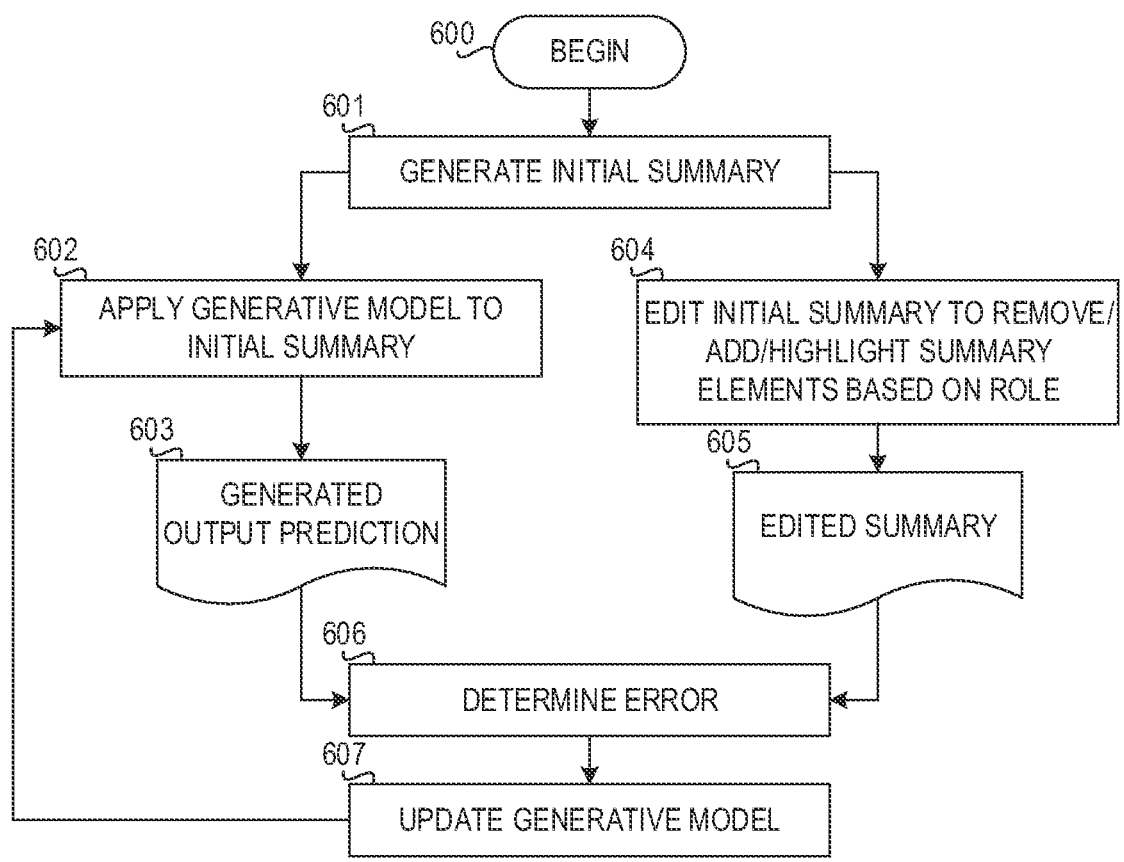
FIG. 6 is a flowchart illustrating operation of an actionable conversation summarization engine for generating a role-based summary in accordance with an illustrative embodiment.

FIG. 6 is a flowchart illustrating operation of an actionable conversation summarization engine for generating a role-based summary in accordance with an illustrative embodiment. Operation begins (600), and the actionable conversation summarization engine generates an initial summary based on multiple conversation data sources (block 601). The actionable conversation summarization engine applies a generative model to the initial summary (block 602) to generate an output prediction 603. The actionable conversation summarization engine also enables a user to edit the initial summary to remove, add, or highlight summary elements based on a given role (block 604) to generate edited summary 605. These summary elements may include role-based actionable items.

Next, the actionable conversation summarization engine determines an error (block 606) in the generated output prediction 603 based on the edited summary 605. The error is determined by comparing the generated output prediction 603 and the edited summary 605. The actionable conversation summarization engine updates the generative model based on the determined error (block 607). In one embodiment, this process repeats for each conversation summary during a training period. Each edited summary 605 provides training data for improving the generative model. The more summaries edited by the users, the more training data provided and the more accurate the generative model will be. In another embodiment, the process of FIG. 6 may be repeated each time a user determines an initial summary can be improved for a given role. Thus, the process may be repeated beyond a training period, thus resulting in a generative model that is always improving.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication-based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for role-based cross data source actionable conversation summarization, the method comprising:

aggregating conversation data from a plurality of conversation data sources;
   applying a computerized summarization process to the aggregated conversation data to generate an initial summary of the aggregated conversation data;
   applying a machine learning classifier to the initial summary to determine, for each sentence in the initial summary, if the sentence comprises an actionable item, to thereby generate a set of actionable items in the initial summary;
   mapping each actionable item in the set of actionable items to at least one role in a plurality of different roles;
   generating, for each role in the plurality of different roles, a corresponding role-specific summary comprising actionable items, from the set of actionable items, mapped to the role, such that at least two role-specific summaries have at least one different actionable item; and
   outputting at least one role-specific summary via at least one user interface.

2. The method of claim 1, wherein the plurality of conversation data sources comprise an email system, an instant messaging platform, and a developer collaboration platform.

3. The method of claim 1, wherein the computerized summarization process is an extraction type computerized summarization process that extracts portions of text from the aggregated conversation data, ranks the extracted portions of text relative to one another, and selects a set of the portions of text based on the ranking to be included in the initial summary of the aggregated conversation data.

4. The method of claim 1, wherein the computerized summarization process comprises a generative pretrained transformer.

5. The method of claim 1, further comprising:
   receiving a user input via the at least one user interface, responsive to outputting the at least one role-specific summary; and
   responsive to the user input indicate the user approving the at least one role-specific summary, incorporating the at least one role-specific summary into a conversation user interface of at least one of the plurality of conversation data sources.

6. The method of claim 5, further comprising:
   responsive to the user input indicating the user not approving the at least one role-based summary, providing feedback to the generative pretrained transformer as training data to train the generative pretrained transformer.

7. The method of claim 4, wherein generating the at least one role-specific summary comprises:
   receiving at least one edit of the initial summary from a user to form an edited role-specific summary;
   comparing the generated role-specific summary and the edited role-specific summary to determine an error in the generated role-specific summary; and
   updating the generative pretrained transformer based on the error.

8. The method of claim 1, wherein the machine learning classifier comprises a supervised learning classifier, wherein the supervised learning classifier is trained using conversation data having labeled role-based action items, and wherein the supervised learning classifier classifies sentences of conversation data to classify sentences as having actionable items or not having actionable items and instead being informative.

9. The method of claim 1, further comprising mapping the actionable item to one or more additional outcomes based on the plurality of roles, and wherein generating the corresponding role-specific summary comprises organizing the one or more additional outcomes by role.

10. A computer program product comprising a computer readable storage medium having a computer readable program stored therein, wherein the computer readable program, when executed on a computing device, causes the computing device to:
- aggregate conversation data from a plurality of conversation data sources;
- apply a computerized summarization process to the aggregated conversation data to generate an initial summary of the aggregated conversation data;
- apply a machine learning classifier to the initial summary to determine, for each sentence in the initial summary, if the sentence comprises an actionable item, to thereby generate a set of actionable items in the initial summary;
- map each actionable item in the set of actionable items to at least one role in a plurality of different roles;
- generate, for each role in the plurality of different roles, a corresponding role-specific summary comprising actionable items, from the set of actionable items, mapped to the role, such that at least two role-specific summaries have at least one different actionable item; and
- output at least one role-specific summary via at least one user interface.

11. The computer program product of claim 10, wherein the plurality of conversation data sources comprise an email system, an instant messaging platform, and a developer collaboration platform.

12. The computer program product of claim 10, wherein the computerized summarization process is an extraction type computerized summarization process that extracts portions of text from the aggregated conversation data, ranks the extracted portions of text relative to one another, and selects a set of the portions of text based on the ranking to be included in the initial summary of the aggregated conversation data.

13. The computer program product of claim 10, wherein the computerized summarization process comprises a generative pretrained transformer.

14. The computer program product of claim 10, wherein the computer readable program further causes the computing device to:
- receive a user input via the at least one user interface, responsive to outputting the at least one role-specific summary; and
- responsive to the user input indicate the user approving the at least one role-specific summary, incorporate the at least one role-specific summary into a conversation user interface of at least one of the plurality of conversation data sources.

15. The computer program product of claim 14, wherein the computer readable program further causes the computing device to:
- responsive to the user input indicating the user not approving the at least one role-based summary, provide feedback to the generative pretrained transformer as training data to train the generative pretrained transformer.

16. The computer program product of claim 13, wherein generating the at least one role-specific summary comprises:
- receiving at least one edit of the initial summary from a user to form an edited role-specific summary;
- comparing the generated role-specific summary and the edited role-specific summary to determine an error in the generated role-specific summary; and
- updating the generative pretrained transformer based on the error.

17. The computer program product of claim 10, wherein the machine learning classifier comprises a supervised learning classifier, wherein the supervised learning classifier is trained using conversation data having labeled role-based action items, and wherein the supervised learning classifier classifies sentences of conversation data to classify sentences as having actionable items or not having actionable items and instead being informative.

18. An apparatus comprising:
- a processor; and
- a memory coupled to the processor, wherein the memory comprises instructions which, when executed by the processor, cause the processor to:
- aggregate conversation data from a plurality of conversation data sources;
- apply a computerized summarization process to the aggregated conversation data to generate an initial summary of the aggregated conversation data;
- apply a machine learning classifier to the initial summary to determine, for each sentence in the initial summary, if the sentence comprises an actionable item, to thereby generate a set of actionable items in the initial summary;
- map each actionable item in the set of actionable items to at least one role in a plurality of different roles;
- generate, for each role in the plurality of different roles, a corresponding role-specific summary comprising actionable items, from the set of actionable items, mapped to the role, such that at least two role-specific summaries have at least one different actionable item; and
- output at least one role-specific summary via at least one user interface.

19. The method of claim 1, wherein outputting the at least one role-specific summary via the at least one user interface comprises outputting the actionable items in the at least one role-specific summary, and associated data used to generate the actionable item, as a navigable conversation tree.

20. The computer program product of claim 10, wherein outputting the at least one role-specific summary via the at least one user interface comprises outputting the actionable items in the at least one role-specific summary, and associated data used to generate the actionable item, as a navigable conversation tree.

* * * * *